May 28, 1935.  W. B. D. PENNIMAN  2,003,120
OIL SEAL AND DUST GUARD FOR JOURNAL BOXES
Filed July 29, 1927
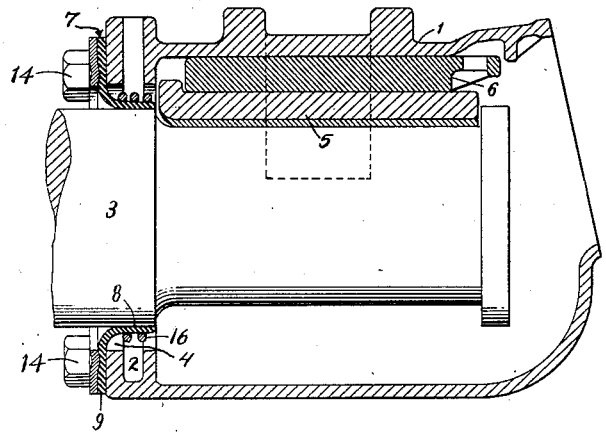
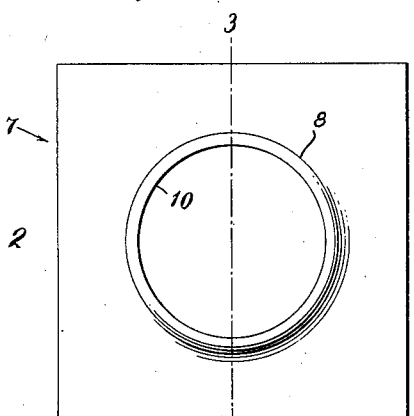
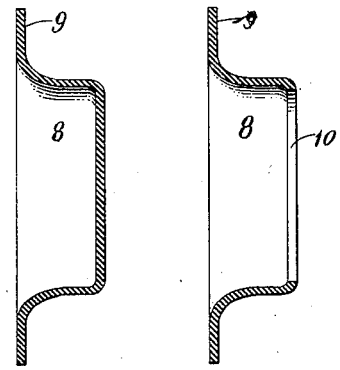
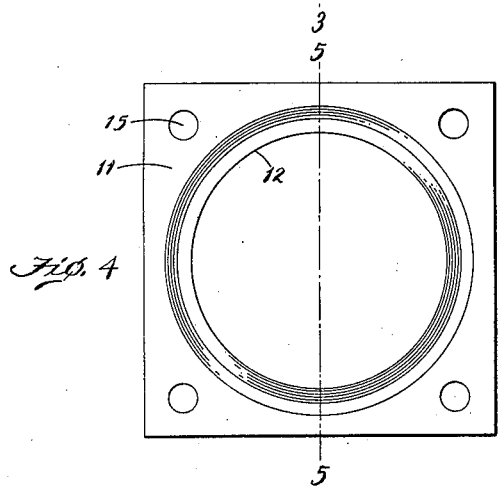
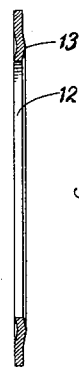

Patented May 28, 1935

2,003,120

UNITED STATES PATENT OFFICE 2,003,120

OIL SEAL AND DUST GUARD FOR JOURNAL BOXES

William B. D. Penniman, Lawyer's Hill, Md.

Application July 29, 1927, Serial No. 209,256

2 Claims. (Cl. 286—5)

The invention relates to oil sealing and dust excluding means for rotatable shafts, axles and similar elements and has special reference to means of this character particularly adapted for but not necessarily limited to use in connection with the journal boxes of railway cars, as well as other vehicles running on tracks.

It is well known in the art that there is a great tendency for the lubricant in journal boxes to creep along the journal or axle or otherwise leak out and be consequently lost, resulting in the necessity for frequently replenishing the lubricant supply within the box. Furthermore there is a tendency for water and dirt to enter the box with detriment to the coacting surfaces. Various expedients have been resorted to in the endeavor to overcome these conditions but, prior to my invention, no adequate means has been discovered for the purpose.

The relative movement between an axle and journal box may be and is often of four or five different kinds and components of them. The most important of these are: 1st, the rotary movement of the axle; 2nd, the to and fro or longitudinal movements of the axle with respect to the journal box and the bearing therein; 3rd, the movements due to more or less slippage of the bearing; 4th, the dropping of the top of the box as the bearing wears; and 5th, the movements of the box due to jarring from the rails, reciprocating effect of springs, etc. Direct observation of cars fitted with dust guards, each of which consisted of a board fastened in the back of the box and in which there was a hole that fitted the journal snugly, has proved that the amount of the movement, as indicated by the wear of the hole, was often between one-fourth and one-half inch in various directions, the original circular holes having become irregularly elliptical but, in all cases, worn in all directions, though the points of greatest wear differed.

To provide against leakage of oil, and entrance of dust and water into the box, the following principles on which my invention is based will, if properly carried out, secure the objects desired notwithstanding the irregularities in the relative movements of the axle and box: 1st, the joint between the rotating axle and part of the seal in contact with it must be tight, or virtually so, against oil, water and dust, or other foreign matter; 2nd, this seal must have as part of it a connection with the box and this must be any elastic, flexible, resilient, supple, pliable or other properly yieldable connection which is also oil, water and dust tight; 3rd, the seal as a whole must be fastened to the box without leakage.

It is with the above facts as to present conditions in view, and with the foregoing general principles in mind, that I have designed the present invention which has for its general object the provision of flexible diaphragm means stationarily secured to the journal box and yieldably engaging the journal or axle so as to permit any of the above set forth irregular movements, or combinations thereof, while maintaining an oil, water and dust tight grip upon or connection with the journal.

An additional object of the invention is to provide means of this character which will be simple and inexpensive to manufacture, easy to install, positive in action, efficient and durable in service, and a general improvement in the art.

To the attainment of the foregoing and other objects and advantages, the invention preferably consists in the details of construction and the arrangement and combination of parts to be hereinafter more fully described and claimed, and illustrated in the accompanying drawing in which:

Figure 1 is a vertical section of the flexible and oil tight portion of the seal showing a step in the course of manufacture, Figure 2 is an elevation of the same portion of the seal showing it as having a circular portion cut and removed, Figure 3 is a vertical sectional view through the flexible portion of the seal with the opening therein, the section being taken on the line 3—3 of Figure 2, Figure 4 is an elevation of the clamping member or plate used to attach the flexible member to the journal box.

Figure 5 is a cross sectional view through this clamping member taken on the line 5—5 of Figure 4, and Figure 6 is a sectional view showing the seal in applied position with respect to a journal box and in operative relation to the axle.

Referring more particularly to the drawing the numeral 1 designates, generally, a journal box of any ordinary or preferred type and having the usual structural characteristics, no great detail being disclosed for the reason that the box itself forms no part of the present invention. However, it is here represented as of the type used in connection with and forming part of the equipment of railway cars. Boxes of this general character are ordinarily provided at the inner end with an upwardly opening slot 2 intended to be occupied by some type of packing means adapted to engage the journal or axle 3 which extends through an opening 4 in the slotted or inner end. The numerals 5 and 6 designate, respectively, a bearing brass and wedge as is the common construction. Such boxes are of course provided with lids and are packed with some suitable absorbent material or wicking soaked or saturated with oil for effecting lubrication of the contacting surfaces of the journal and bearing. The lid and packing are not shown nor is any structure illustrated for mounting the box in the side frame or other portion of a car truck. It should be mentioned that the opening 4 is of considerably larger diameter than the axle to permit the above described relative movements without the axle coming in contact with the edge of the opening. In accordance with my invention there is no necessity whatsoever for providing any packing means within the slot 2 if the box be of that type having such a slot therein inasmuch as I have provided entirely different means for preventing escape of oil and entrance of foreign matter, my sealing means being, furthermore, capable of application not only to journal boxes of types different from that illustrated but also adapted for employment in connection with other relatively movable and more or less equivalent structural elements.

Broadly speaking, I accomplish the desired results by providing a flexible, elastic, resilient, pliable, supple or other properly yieldable diaphragm which may be considered as acting as a hinge connection between the box and the axle so as to permit relative movements, means being of course provided for securing this diaphragm tightly to the journal box, or its equivalent.

In the practical carrying out of the invention, I preferably employ a flexible or elastic diaphragm constructed of leather, this being a highly satisfactory material for the purpose owing to its inherent flexibility, and its toughness. A piece of leather of suitable size and shape is soaked in water until it can be stretched in any direction and is then placed in a mold or between dies and subjected to hydraulic or other suitable pressure to form it into the desired shape which may be described as somewhat cup-like. It is then dried in the mold so that it will retain its shape and is subsequently soaked in sperm or other oil. It is of course conceivable that some other method might be followed in the actual formation if desired. The diaphragm or flexible seal member will then have the shape clearly illustrated in Figures 1 and 2 of the drawing wherein the numeral 7 designates the flexible member as a whole, 8 the pressed-out central projecting portion, and 9 the outstanding flange portion which is utilized for attaching purposes in a manner to be explained. A circular opening 10 is then cut centrally in the closed end of the projecting portion 8 so that this portion 8 will constitute a sleeve as illustrated in Figures 2 and 3 and the intention is that this opening be of less diameter than the axle or journal in connection with which the seal is to be used so that when the seal is forced onto an axle, or the axle forced through the seal, the sleeve portion 8 will embrace the axle very closely and make an oil, water and dust tight connection therewith. Actually, the opening may be, say, one-fourth inch less than the diameter of the axle and it is also intended that the inside diameter of the projecting sleeve portion 8 be less, say, one-eighth inch, than the diameter of the axle, all for the same reason.

The invention further includes means for securing this flexible diaphragm to the journal box, this means being shown in detail in Figures 4 and 5 wherein it is shown as comprising a plate 11 having a central opening 12 which may be of approximately the same diameter as the opening 4. This plate is represented as stamped, pressed or otherwise formed to provide a ridge 13 concentric with the opening and adapted to engage and compress the flange 9 of the diaphragm member against the end of the journal box when the seal is in applied position as illustrated in Figure 6, bolts, cap screws or the like indicated at 14 being adapted to pass through holes 15 in the plate, other holes in the flange portion 9 and into the journal box. Some other equivalent fastening means might be used but this is highly satisfactory for the purpose.

When the seal is applied as shown it is of course apparent that the sleeve portion 8 of the diaphragm will engage closely about the axle and will operate effectually to prevent the escape of oil and the entrance of any foreign matter regardless of the position the axle may assume with respect to the journal box. If found desirable for any reason, I may, as an additional precaution, provide a spring 16 in encircling relation to the sleeve portion 8 of the seal for reinforcing the elasticity or resilience of the leather. It is not contemplated that this spring be used in all instances as it would not be necessary but its employment may prove of importance in a case where a workman installs a seal which is slightly too large for the particular axle.

From the foregoing description and a study of the drawing it will be apparent that I have thus provided a simply constructed, inexpensive and easily applied and replaced device for the purpose specified and one which will efficiently perform all the functions for which it is intended.

While I have shown and described the preferred embodiment of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. Means for preventing escape of oil from journal boxes of railway rolling stock wherein the weight of the car is received by the axle through a segmental bearing thereby permitting substantial transverse movements between the axle and the bearing and its associated journal box incident to operation, said means comprising a resilient, elastic sheet of packing material secured in substantially oil-sealing relation to the end of the journal box, and having an axially extending flange portion closely embracing the end of the axle whereby said transverse movements are substantially absorbed in the portion of said sheet lying between the securing means and the axle.

2. Means for preventing escape of oil from journal boxes of railway rolling stock wherein the weight of the car is received by the axle through a segmental bearing thereby permitting substantial transverse movements between the axle and the bearing and its associated journal box incident to operation, said means comprising an oil impregnated softened leather sheet having an outstanding sleeve portion secured in substantially oil sealing relation to the end of the journal box by securing means including a clamping plate secured on said journal box, the outstanding sleeve portion of the sheet lying between said clamping plate and the box, said sheet having an axially extending flange portion closely embracing the axle, whereby said transverse movements are substantially absorbed in the portion of said sheet lying between the securing means and the axle.

WILLIAM B. D. PENNIMAN.